(12) United States Patent
Tengler et al.

(10) Patent No.: US 8,442,759 B2
(45) Date of Patent: May 14, 2013

(54) SYSTEM AND METHOD FOR PROVIDING MULTIPLE PORTIONS OF A ROUTE IN A TELEMATICS SYSTEM

(75) Inventors: Steven C. Tengler, Grosse Pointe Park, MI (US); Richard A. Johnson, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 892 days.

(21) Appl. No.: 12/165,311

(22) Filed: Jun. 30, 2008

(65) Prior Publication Data

US 2009/0326797 A1    Dec. 31, 2009

(51) Int. Cl.
*G01C 21/00* (2006.01)
*G01C 21/34* (2006.01)
*G08G 1/123* (2006.01)

(52) U.S. Cl.
USPC ........... 701/425; 701/400; 701/421; 701/423; 340/995.12; 340/995.19

(58) Field of Classification Search ................ 701/200, 701/201, 202, 205, 206, 208, 209, 213, 23, 701/400, 408–411, 414, 415, 420, 421, 423–425; 340/990, 995.1–995.28
See application file for complete search history.

(56) References Cited

U.S. PATENT DOCUMENTS

| | | | |
|---|---|---|---|
| 6,701,248 B2 * | 3/2004 | Petzold et al. | 701/202 |
| 7,421,337 B2 * | 9/2008 | Lapstun et al. | 701/202 |
| 7,463,976 B2 * | 12/2008 | Nomura | 701/209 |
| 7,493,214 B2 * | 2/2009 | Jung et al. | 701/209 |
| 7,606,662 B2 * | 10/2009 | Tengler et al. | 701/209 |
| 7,627,423 B2 * | 12/2009 | Brooks | 701/202 |
| 7,680,589 B2 * | 3/2010 | Yamada | 701/200 |
| 7,684,928 B2 * | 3/2010 | Kodani et al. | 701/209 |
| 7,739,039 B2 * | 6/2010 | Obradovich et al. | 701/208 |
| 2003/0229446 A1 * | 12/2003 | Boscamp et al. | 701/213 |
| 2004/0039520 A1 * | 2/2004 | Khavakh et al. | 701/201 |
| 2006/0031007 A1 * | 2/2006 | Agnew et al. | 701/204 |
| 2006/0080029 A1 * | 4/2006 | Kodani et al. | 701/208 |
| 2008/0004802 A1 * | 1/2008 | Horvitz | 701/209 |
| 2008/0059061 A1 * | 3/2008 | Lee | 701/209 |

* cited by examiner

*Primary Examiner* — Thomas Tarcza
*Assistant Examiner* — Rami Khatib

(57) ABSTRACT

A method for communicating navigational information to a telematics unit. The method comprises receiving route requirements; calculating a plurality of portions of a route, each portion calculated according to different sets of criteria, the criteria determined from the route requirements; and sending the plurality of portions to the telematics unit. The portions of the route can be provided to the telematics unit sequentially, with non-final portions including a trigger for indicating to the telematics unit when to request the next portion. The portions can also be provided to the telematics unit as a complete route comprising concatenated route portions.

13 Claims, 5 Drawing Sheets

SYSTEM AND METHOD FOR PROVIDING MULTIPLE PORTIONS OF A ROUTE IN A TELEMATICS SYSTEM

FIELD OF THE INVENTION

The invention relates generally to the field of telematics, and more specifically, to the field of navigation services.

BACKGROUND OF THE INVENTION

Many modern vehicles incorporate telematics devices for providing a variety of fee-based subscription services in a mobile environment, including navigational assistance. An in-vehicle telematics device typically includes a plurality of communication interfaces, including cellular and/or satellite transceivers. As part of providing navigational assistance, for example when requesting and receiving road network data, a telematics device may establish a radio communication link with a call center via a wireless (e.g., cellular) network.

Typically, with a telematics system, a driver wanting navigational assistance establishes communication with an operator and tells the operator where he or she wants to go and provides any criteria about how he or she would like to get there. For example, the driver can tell the operator that he or she wishes to drive to a particular city, but by taking a scenic route instead of the most direct route or the fastest route. With this information, the operator instructs a telematics unit of the driver's vehicle to contact a navigation server, which will provide a route to the telematics unit according to the criteria. The telematics unit then gives turn-by-turn instructions to the driver on how to reach the destination according to the requested criteria.

Sometimes drivers wish to reach their destination with particular criteria such that the criteria for distinct portions of a route are not uniform. For example, a driver wanting a scenic route may not want simply the scenic route from one location to another, but may want to drive a further distance to a different scenic route to get the final destination. For instance, a scenic route from one destination to another may be through the mountains, but a driver may wish not to drive through the mountains, but to drive along the coast. Therefore the driver may want the quickest route to the coast, and then proceed along the coast as far as possible in order to reach his or her destination. As another example, in case of an emergency situation, a driver may want the quickest route to a particular evacuation route instead of a route specified as an evacuation route from the driver's current location.

Generally, navigation systems provide routes where each complete route is based on criteria applying to the complete route, but do not provide routes where different portions of a route may have differing criteria. Therefore, if a driver, for example, wants different portions of a complete route to have different criteria, he or she must establish communication with the operator in order to request a new portion of the route after each portion is completed. For example, if a driver wants to get to the coast as quickly as possible and then drive along the coast to his or her destination, he or she must request a route to the coast from the operator who will provide the quickest route to the coast. Upon reaching the coast, the driver must contact the operator again to request a scenic route from the driver's current location to his or her destination.

BRIEF SUMMARY OF THE INVENTION

The invention provides a method for communicating navigational information to a telematics unit. In an example, the method comprises receiving route requirements; calculating an initial portion of the route according to a first set of criteria, the first set of criteria determined from the route requirements; sending the initial portion and a trigger condition to the telematics unit; receiving information from the telematics unit upon fulfillment of the trigger condition; and calculating at least one additional portion of the route according to a second set of criteria, the second set of criteria different from the first set of criteria.

In accordance with another example, the method comprises receiving route requirements; calculating a plurality of portions of a route, each portion calculated according to different sets of criteria, the criteria determined from the route requirements; and sending the plurality of portions to the telematics unit.

In accordance with yet another example, a system for providing navigational information to a driver is included. The system includes a telematics unit, a navigation server, and a mechanism for providing communication between the telematics unit and the navigation server. The telematics unit provides route requirements from the driver. The navigation server receives the route requirements and calculates a plurality of route portions from the route requirements. At least two of the route portions are based on differing sets of criteria from the route requirements.

BRIEF DESCRIPTION OF THE SEVERAL VIEWS OF THE DRAWING(S)

DETAILED DESCRIPTION OF THE INVENTION

In the following description, various examples of the present invention will be described. For purposes of explanation, specific configurations and details are set forth in order to provide a thorough understanding of the examples. However, it will also be apparent to one skilled in the art that the present invention may be practiced without the specific details. Furthermore, well-known features may be omitted or simplified in order not to obscure the example being described.

Figure 1:
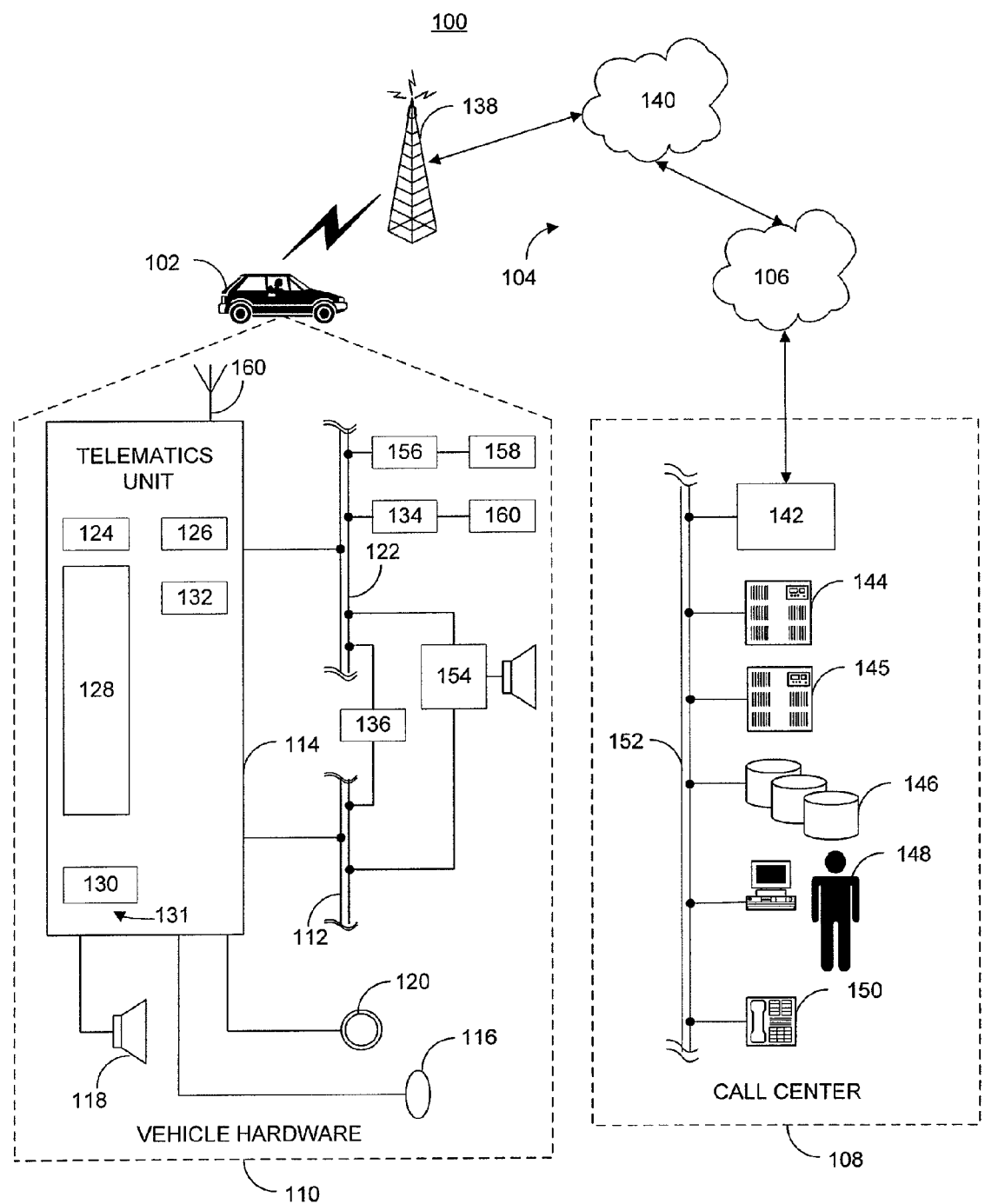
FIG. 1 is a schematic diagram illustrating a system for delivery of N-vehicle telematic services as contemplated by an example of the present invention.

Referring now to the drawings, in which like reference numerals represent like parts throughout the several views, FIG. 1 shows an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

The vehicle 102 is preferably a mobile vehicle such as a motorcycle, car, truck, recreational vehicle (RV), boat, plane, etc., and is equipped with suitable hardware and software that enables it to communicate over the system 100. Some of the vehicle hardware 110 is shown generally in FIG. 1, including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128, one or more types of electronic memory 130 having stored thereon software 131, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 may not include all of the components listed above and may include a number of known components in addition to those listed above.

Vehicle communications preferably use radio transmissions to establish a voice channel with wireless a carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, a wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. A dual mode antenna 160 services the GPS chipset/component and the cellular chipset/component.

A microphone 116 provides the driver or other vehicle occupant with a means for inputting verbal or other auditory commands, and can be equipped with an embedded voice processing unit utilizing a human/machine interface (HMI) technology known in the art. Conversely, a speaker 118 provides verbal output to the vehicle occupants and can be either a stand-alone speaker specifically dedicated for use with the telematics unit 114 or can be part of a vehicle audio component 154. In either event, the microphone 116 and speaker 118 enable the vehicle hardware 110 and a call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push-button used to initiate voice communication with call center 108 (whether it be a live advisor or an automated call response system, collectively referred herein as an operator 148). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. The audio component 154 may contain a speaker system, or may utilize a speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 160, connected to various sensor interface modules 134 are operatively connected to the vehicle bus 122. Examples of vehicle sensors include, but are not limited to gyroscopes, accelerometers, magnetometers, emission detection and/or control sensors, and the like. Example sensor interface modules 134 include powertrain control, climate control, and body control, to name but a few.

The wireless carrier system 104 is preferably a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with a land network 106. As appreciated by those skilled in the art, various cell tower/based station/MSC arrangements are possible and could be used with wireless system 104. For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

The land network 106 can be a conventional land-based telecommunications network that is connected to one or more landline telephones and connects a wireless carrier network 104 to call center 108. For example, the land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

The call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. In an example, the call center 108 is configured to provide the vehicle hardware 110 with a navigation server 145, the navigation server configured to receive route criteria and to provide a route to the vehicle hardware 110, as is known in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, a database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
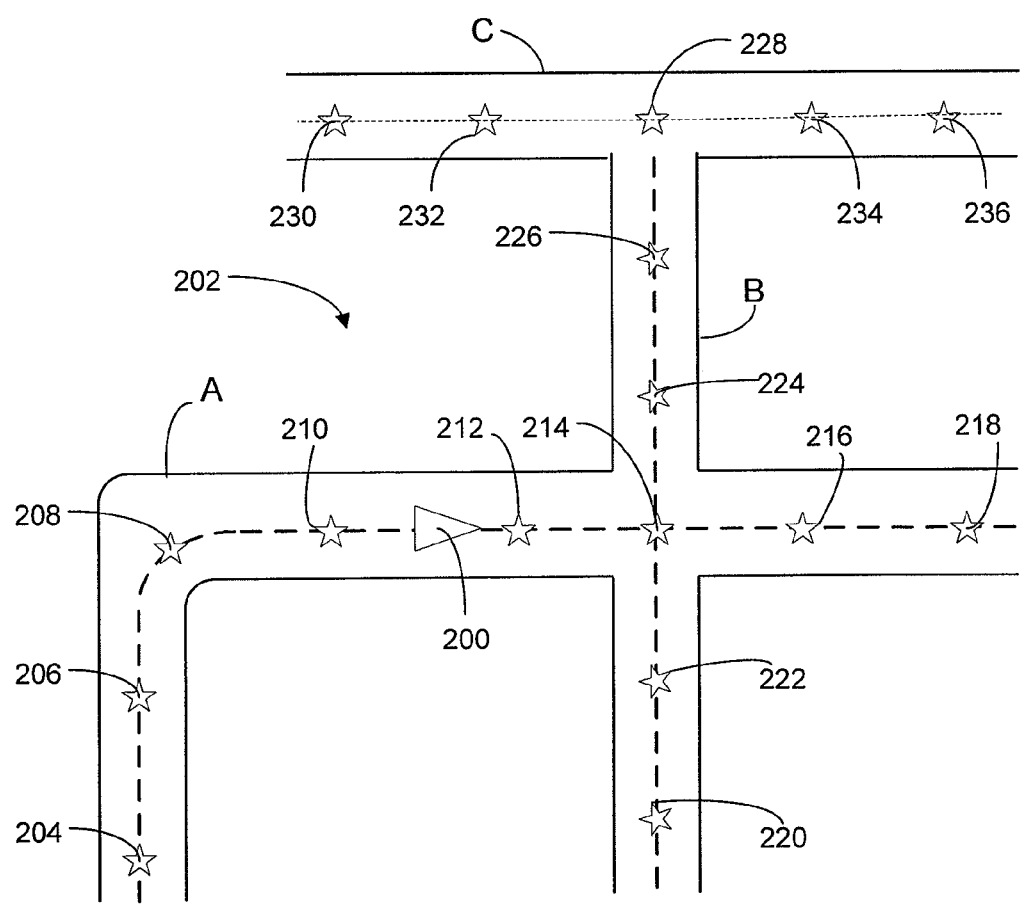
FIG. 2 is a schematic diagram of a spatial relationship between location points comprising at least one of the roads of a road network in accordance with an example.

With reference to FIG. 2, the telematics unit 114 communicates with the call center 108 to receive the road network data and provide positioning, route guidance, and other navigational functionality by comparing the vehicle's current position 200 to the surrounding map data 202 and, optionally, the route guidance instructions received from the call center 108. Preferably, the telematics unit 114 incrementally receives map data 202 from the call center 108 as the vehicle 102 changes its position 200. The positional data comprising the map data 202 corresponds to a predetermined part of the overall road network data set. The memory 130 of the telematics unit 114 includes navigation software in the form of computer-readable instructions 131 for processing the road network as a plurality of points 204-236, wherein each point is a location defined by a latitude and longitude. Thus, a length of road A is represented by a series of points 204-218, while an intersecting length of road B is represented by points 220, 222, 214, 224-228, where the common point 214 defines an intersection of roads A and B. Similarly, a length of road C is represented by points 230, 232, 228, 234, 236 with point 228 common to both roads B and C and defining their intersection. It should be noted that a given point may define intersections of varying complexity by commonly representing two or more roads.

To maximize the availability of internal memory storage 130 and to comply with the bandwidth limitations of the wireless carrier system 104, the telematics unit 114 incrementally requests road network data from the call center 108. The newly received road network data is used to provide routing and other navigational functionality corresponding to the changes in the vehicle location 200. In one example, the telematics unit 114 requests additional road network data when the current vehicle location 200 no longer corresponds to a location point stored within its memory. Alternatively or in addition, the telematics unit 114 requests additional road network data when route guidance data lies outside of the network data stored within its memory. In another example, the telematics unit 114 is capable of requesting additional road network data based on evaluating the availability of locally stored road network data within a predetermined radius from the current location 200.

Figure 3:
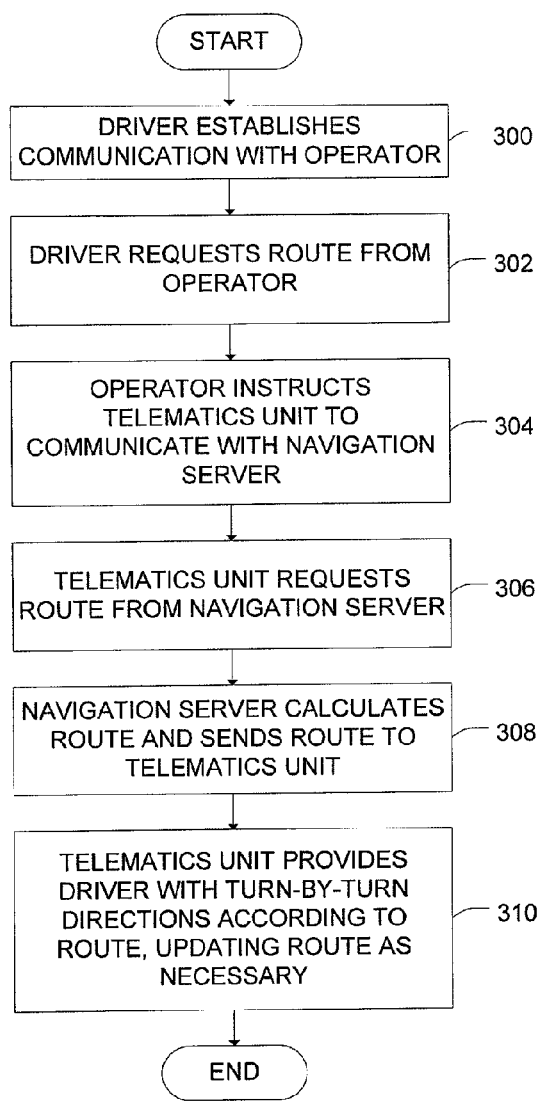
FIG. 3 is a flow chart of a method for providing multiple portions of a route with differing criteria in accordance with an example.

FIG. 3 shows a method for providing multiple routes in accordance with an example. It will be appreciated that each program, module, and functional computational unit described herein, and each step executed by the telematics unit 114, navigation server 150, or other component described herein, is implemented in an example by a computer or computing device (generically "computer") reading computer-executable instructions from a computer-readable medium and executing said instructions or causing them to be executed. The computer-readable medium is a physical fixed medium such as a magnetic or optically readable (and potentially writable) disc, circuit, array, or other physically tangible element. In an alternative example, "transient computer-readable media" may be used additionally or alternatively. Such media include radio and optical transmissions (generically "electromagnetic transmissions"), audio transmissions, whether human-perceivable or not, and so on. It will be appreciated that "computer-readable media" are distinct from "transient computer-readable media."

At a communication establishing step 300, the driver establishes communication with the operator 148. Various telematics units can have varying mechanisms for establishing such communication with the operator 148. In an example, establishing communication with an operator 148 includes pressing the button 120 which can be a blue button of the telematics unit 114 found on well-known OnStar® telematics units. When communication with the operator 148 is established, the driver requests a route from the operator 148 at a route requesting step 302. For example, in an example, the driver orally requests a route to a particular city, taking a scenic route or taking a particular scenic route. A route can also be requested using other mechanisms, such as by inputting route criteria via a user interface of the telematics unit 114. Preferably, the operator 148 then instructs the telematics unit 114 to communicate with the navigation server 145 at an operator instruction step 304. However, other protocols, such as instructing the navigation server 145 to communicate with the telematics unit 114, can also be used.

In an example, when the operator 148 sends instructions to the telematics unit 114 to communicate with the navigation server 145, the operator 148 sends a signal to the telematics unit 114, instructing the telematics unit 114 to communicate with the navigation server 145 in a manner that is transparent to the driver, such as by sending a signal to the telematics unit 114 that is processed by the telematics unit 114 without requiring any driver intervention. Upon receiving instructions from the operator 148 to communicate with the navigation server 145, the telematics unit 114 requests a route from the navigation server 145 at a telematic route requesting step 306. In an example, the telematics unit 114 sends the driver's current location, requested destination, and criteria for how to reach the destination to the navigation server 145. Upon receiving the route request from the telematics unit 114, the navigation server 145 then calculates a route and sends the route to the telematics unit 114 at a route calculation step 308. Once the navigation server 145 communicates the route and sends the route to the telematics unit 114, the telematics unit 114 provides the driver with turn-by-turn directions according to the route at a directing step 310. In an example, providing turn-by-turn direction involves providing the driver an audible instruction, such as an instruction to turn a particular direction to a particular street, each time the telematics unit 114 determines that the driver is approaching a location requiring driver intervention, such as when the driver must turn from one street to another in order to follow the route provided. Visual or other instructions can be provided instead of or in addition to audible instructions.

If the driver, either intentionally or inadvertently, takes a turn diverging from the provided route, the telematics unit 114, in an example, informs the driver that he or she has diverged from the route and requests instructions whether the driver wishes to receive instructions to return to the route. If the driver provides an affirmative answer, the telematics unit 114 instructs the navigation server 145 to calculate a new route. The new route can be a direct or other route to the original requested route, a complete route recalculated from the driver's current location and according to the driver's requested criteria, or another route. In general, any method for interacting with the driver when the driver has diverged from his or her requested route can be used. For example, the telematics unit 114 can calculate a new route using data stored in the telematics unit 114, or the telematics unit 114 can send to the driver's location the destination and criteria to the navigation server 145, so that the navigation server 145 calculates a new route from the driver's location and provides that new route to the telematics unit 114.

Figure 4:
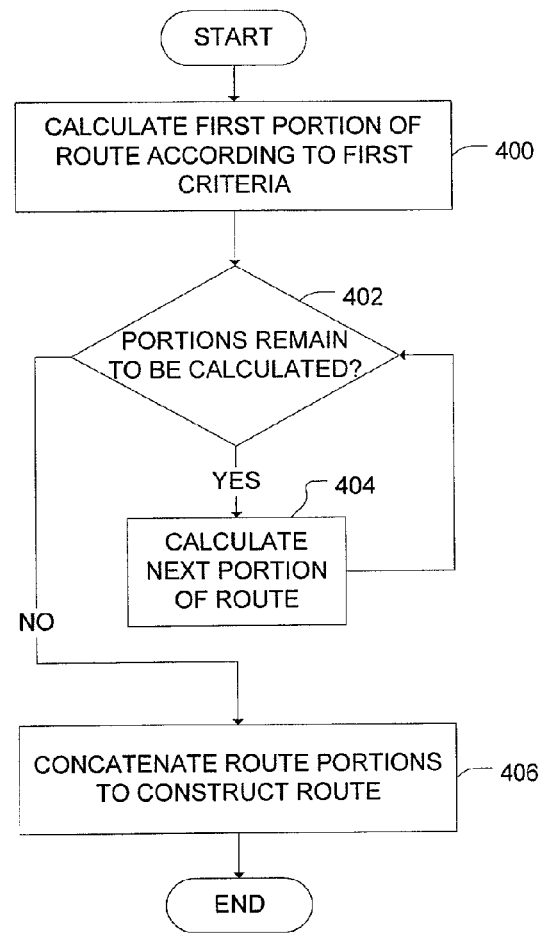
FIG. 4 is a flow chart of a method for calculating the route of FIG. 3.

FIG. 4 shows the route calculation step 308 in greater detail. In an example, the navigation server 145 calculates the first portion of the requested route according to first criteria at an initial route calculation step 400. For example, the navigation server 145 can calculate the quickest distance to a particular scenic route requested by the driver or the quickest distance to an evacuation route from a city in which the driver is located or to which the driver is proximate. If the driver has requested multiple criteria for the initial portion of the route, the navigation server 145 can combine the criteria to satisfy the driver's request. For instance, if the driver requested that the initial portion of the route be quick but scenic, the navigation server can provide a route that is quick but scenic, such as the quickest of several possible scenic routes available for the initial portion of the route. At a route completion checking step 402, the navigation server 145 determines whether any portion of the route remains to be calculated. If the route is not complete, such as when the driver's requested route includes two portions and only one portion has been calculated, the navigation server 145 calculates the next portion of the route according to the driver's criteria for that portion at a route portion calculation step 404. Once the next portion of the route is calculated, the navigation server 145 returns to the route completion checking step 402. If the navigation server 145 determines that no portions remain to be calculated, the navigation server 145 concatenates route portions to construct a route. This route is then sent to the telematics unit 114, so that the telematics unit 114 can provide the driver with turn-by-turn instructions.

Figure 5:
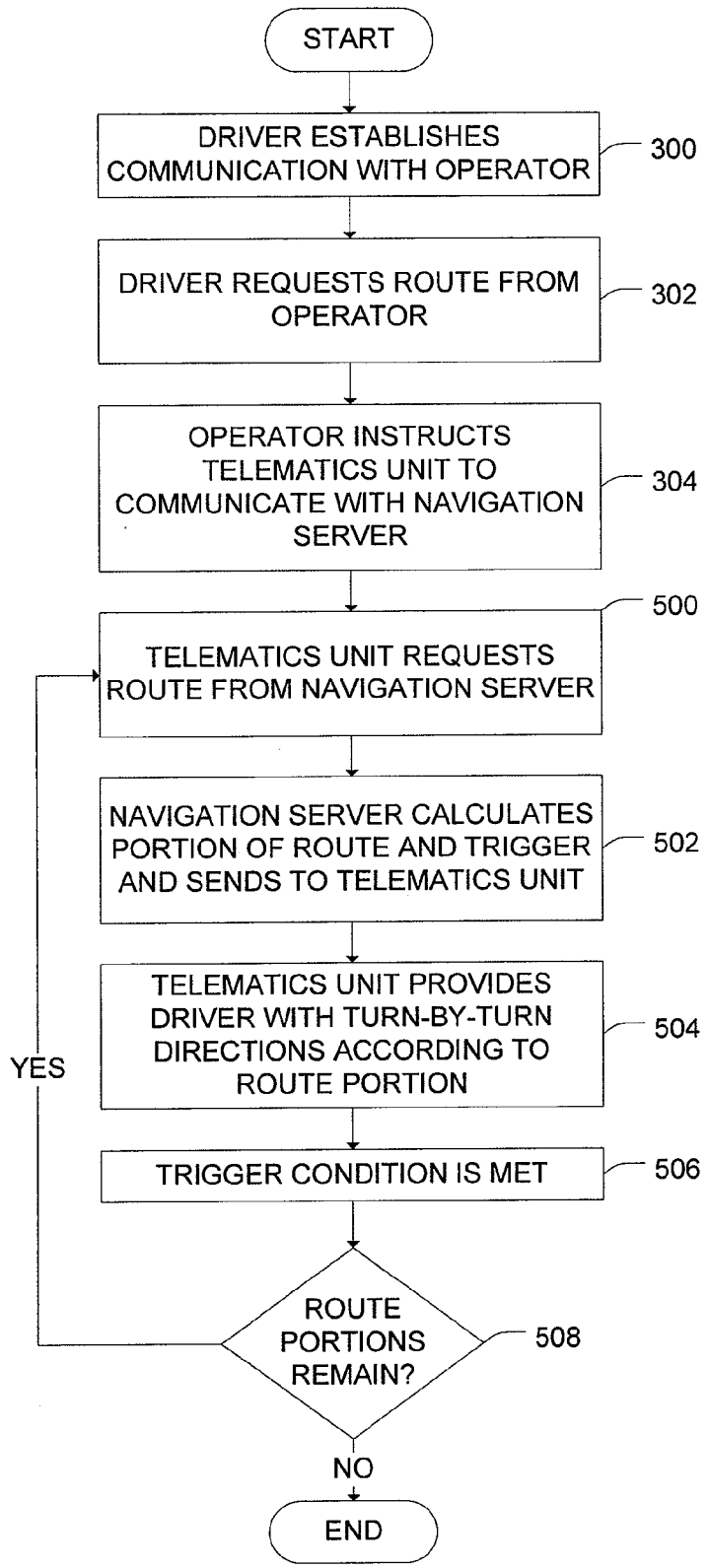
FIG. 5 is a flow chart of a method for providing multiple portions of a route having differing criteria in accordance with another example.

FIG. 5 shows a flow chart for a method for providing a route with multiple portions having differing criteria in accordance with another example. In an example, the method proceeds from the communication establishing step 300 to the operator instruction step 304 as discussed above, although it may begin differently than the method described in FIG. 4. Once the operator instructs the telematics unit 114 to communicate with the navigation server 145, the telematics unit 114 requests a route from the navigation server 145 at a route requesting step 500. In an example, requesting the route from the navigation server 145 includes the telematics unit 114 sending the navigation server 145 the driver's current location, requested destination, and criteria for how the driver wishes to reach his or her destination. With the information received from the telematics unit 114, the navigation server 145 calculates a portion of the route according to criteria and a trigger, and sends that portion of the route and the trigger to the telematics unit 114. As an example, if the driver's criteria includes that he or she wants the quickest route to a scenic route along the coast so that he or she can take a scenic route along the coast to his or her destination, the navigation server 145 can determine the distance to the coast according to the quickest route to the coast and send that quickest route to the coast and the distance to the telematics unit 114.

Once the telematics unit receives the route portion and trigger from the navigation server 145, the telematics unit 114 provides the driver with turn-by-turn instructions for that route portion, at a directing step 504, until the trigger condition is met at a trigger condition step 506. For instance, in the example described above, the telematics unit 114 provides the driver with turn-by-turn instructions until the driver has proceeded on the route portion for the number of miles required to reach the scenic route requested, where the number of miles is the trigger. Other triggers can also be used in addition to or instead of a distance. For instance, a trigger may be a location near an end point of a current route portion and the trigger condition can be met when a global positioning system, such as the GPS chipset/component 132, of the telematics unit 114 determines that the driver is near the end of a current route portion.

Upon detecting that the trigger condition has been met, the telematics unit 114 determines whether any portions remain of the route in order to complete the route at a route completion checking step 508. If portions remain, the telematics unit 114 returns to the route requesting step 500 and requests the route from the navigation server 145. In an example, the telematics unit 114 stores criteria for each route portion and sends that criteria each time the telematics unit 114 communicates with the navigation server 145 for a new route portion. However, the criteria can also be stored in the navigation server 145 or another location. If no route portions remain at the route completion checking step 508, the driver has reached his or her destination.

Figure 6:
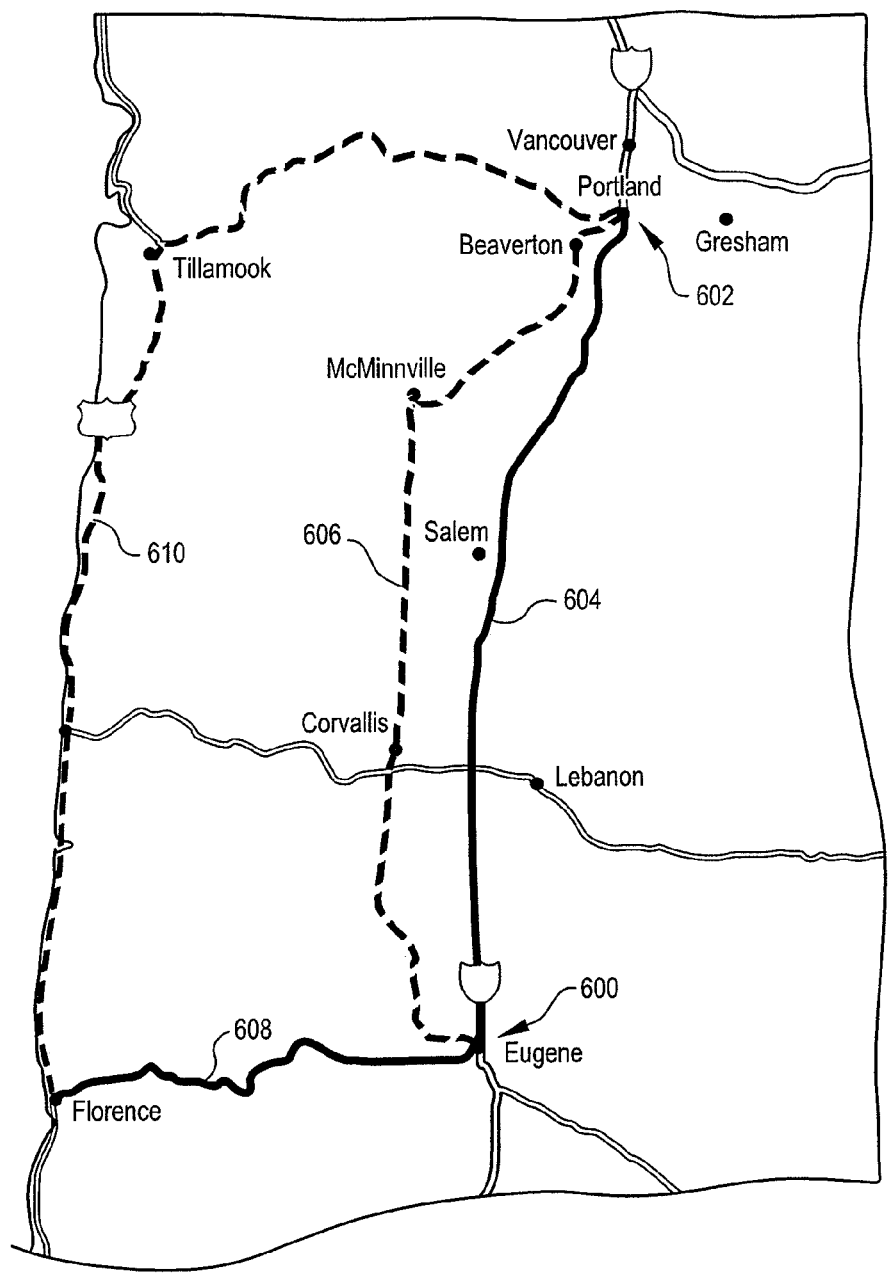
FIG. 6 is a map showing various routes between two destinations, the routes having differing criteria.

FIG. 6 shows a map having various routes between Eugene 600 and Portland 602 in order to illustrate various examples. For example, a direct route that is the quickest route, labeled as route 604, between Eugene 600 and Portland 602 proceeds along an interstate highway in approximately a straight line between the two cities. A scenic route between Eugene 600 and Portland 602 would proceed along the scenic route 606 from Eugene 600 to Portland 602 travelling along a more scenic but less direct route through towns such as Corvallis, McMinnville, and Beaverton along a scenic route 606. However, if a driver wishes to proceed along the coast on his or her way to Portland 602 from Eugene 600, a typical navigation server or other routing system may not have a coastal route stored as a scenic route between Eugene 600 and Portland. According to an example, for example, a driver in Eugene would establish communication with the operator 148 and tell the operator 148 that he or she would like to drive from Eugene 600 to Portland 602 but by way of the coast. The operator 148 then would instruct the driver's telematics unit 114 to communicate with the navigation server 145 to provide a route according to the driver's criteria.

In an example, the navigation server 145 calculates the quickest route to the coast, and then calculates a scenic route along the coast to Portland from that point. In the example demonstrated in FIG. 6, a first portion 608 to the coast proceeds westbound on a route 608 directly to the coast, and a second portion 610 proceeds along the coast towards Portland 602. The first portion 608 and second portion 610 are concatenated to form a complete route which is sent to the telematics unit 114 so that the telematics unit 114 can provide the driver with turn-by-turn instructions according to the route.

In another example, the navigation server 145 calculates the quickest route to the coast and sends that route as a first portion 608 to the telematics unit 114. The navigation server 145 also concurrently sends the distance from the Eugene 600 to the coastal route 610 as a trigger to the telematics unit 114, so that the telematics unit 114 is triggered to establish communication with the navigation server 145 to request and receive the next portion of the route, the scenic portion 610.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred examples of this invention are described herein, including the best mode known to the inventors for carrying out the invention. Variations of those preferred examples may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for communicating navigational information to a telematics unit, comprising:
receiving route requirements, the route requirements including at least a location and a destination;
calculating a single route to the destination, including calculating an initial portion of the route according to a first set of criteria and calculating at least one additional portion of the route according to a second set of criteria, wherein the first and second sets of criteria include a route type selected from the group consisting of scenic, minimum distance, minimum travel time, and minimum tolls, and wherein the route type of the first criteria is different from the route type of the second set of criteria;
sending the initial portion of the route and a trigger condition to the telematics unit, wherein the trigger is determined before any portion of the route is sent to the telematics unit;
receiving information from the telematics unit indicating fulfillment of the trigger condition; and
sending the at least one additional portion of the route to the telematics unit.

2. The method of claim 1, wherein the trigger condition is based on a distance of the first portion.

3. The method of claim 1, further comprising updating the initial portion upon divergence from the route by the telematics unit.

4. The method of claim 1, further comprising sending instructions to the telematics unit to communicate with a navigation server, the navigation server for determining the initial portion and at least one additional portion.

5. The method of claim 1, further comprising establishing a communication link with the telematics unit.

6. A method for communicating navigational information to a telematics unit, comprising:
receiving route requirements, the route requirements including at least a location and a destination;
calculating a plurality of portions of a single route to the destination, each portion calculated according to a different set of criteria, wherein each set of criteria includes a route type selected from the group consisting of scenic, minimum distance, minimum travel time, and minimum tolls, and wherein the route type of each set is different from the route type of any other set;
sending an initial portion of the single route and a trigger to the telematics unit, wherein the trigger is determined before any portion of the route is sent to the telematics unit;
receiving an indication from the telematics unit that an event corresponding to the trigger has transpired; and
only after occurrence of the trigger sending at least one remaining portion of the single route to the telematics unit.

7. The method of claim 6, wherein the trigger is a distance travelled along the initial portion.

8. The method of claim 6, wherein the route requirements include a location and a destination.

9. The method of claim 6, further comprising updating a single portion of the plurality of portions upon divergence from the portion by the telematics unit.

10. The method of claim 6, wherein the criteria include that the initial portion or the at least one additional portion be at least one of a scenic portion, a portion minimizing distance between two points, a portion minimizing time travelled between two points, a portion minimizing tolls, and an evacuation portion.

11. A system for providing navigational information to a driver of a vehicle, the system comprising:
a telematics unit for receiving route requirements from the driver, the route requirements including at least a location and a destination;
a navigation server for receiving the route requirements via the telematics unit and calculating a plurality of route portions of a single route to the destination, at least two of the route portions being based on differing sets of criteria, wherein each set of criteria includes a route type selected from the group consisting of scenic, minimum distance, minimum travel time, and minimum tolls, and wherein the route type of each set is different from the route type of any other set, and for sending a first portion of the single route to the telematics unit first, and sending a second portion of the single route to the telematics unit only upon occurrence of a predefined trigger condition, wherein the trigger is determined before any portion of the single route is sent to the telematics unit; and an interface for providing communication between the telematics unit and the navigation server.

12. The system of claim 11, wherein the interface for providing communication between the telematics unit and the navigation server comprises an operator for receiving the route requirements from the telematics unit and instructing the telematics unit to communicate with the navigation server.

13. The system of claim 11, wherein the navigation server is configured to send the plurality of portions sequentially.

* * * * *